June 8, 1948. D. L. BEAM 2,442,754
COMBINED SUPPORT, SEPARABLE FASTENER, AND VIBRATION INSULATOR
Filed Aug. 23, 1944

INVENTOR.
DONALD L. BEAM
BY William D. Hall.
ATTORNEY

Patented June 8, 1948

2,442,754

UNITED STATES PATENT OFFICE 2,442,754

COMBINED SUPPORT, SEPARABLE FASTENER, AND VIBRATION INSULATOR

Donald L. Beam, Dayton, Ohio

Application August 23, 1944, Serial No. 550,813

1 Claim. (Cl. 248—27)

(Granted under the act of March 3, 1883, as amended April 30, 1928; 370 O. G. 757)

The invention described herein may be manufactured and used by or for the Government for governmental purposes, without the payment to me of any royalty thereon.

The invention to be herein described relates to connectors or fasteners which are at the same time supports, and which are inherently vibration insulators.

Electric meters of various types and for various purposes are regularly mounted in or on panels, plates or similar supports adjacent motors, generators or other machinery creating considerable vibration. Likewise, in use in planes, for instance, there is a great deal of vibration due to operation of the engines, atmospheric conditions, etc. Many other causes of serious and harmful vibrations will be obvious to those familiar with the uses and mountings of various meters. Many attempts have been made and devices developed aimed at eliminating or minimizing shock and effects of shock in meter mountings. Those heretofore provided are either inadequate, inefficient, bulky, complicated or costly or objectionable for two or more of those reasons.

The present invention eliminates or minimizes all of the above and other objections and provides a simple, compact, efficient, low cost, support, fastener, and vibration insulator quickly and readily applicable with minimum time and labor and readily renewable or replaceable in whole or in part with minimum time, labor and material.

In order to more clearly disclose the construction, operation and use of the invention, reference should be had to the accompanying drawings forming part of the present application.

Throughout the several figures of the drawings, like reference characters will designate the same parts in the different figures.

Figure 1:
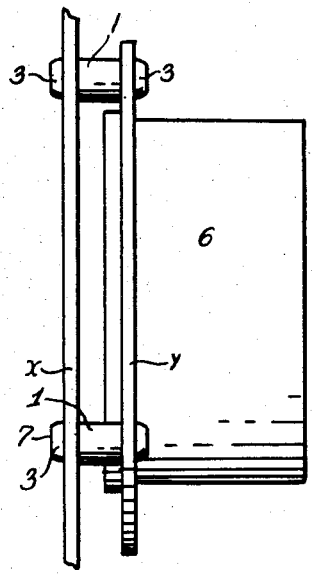
Fig. 1 is a side elevation, showing a fragment of a panel, with a meter mounted vertically, the meter being merely indicated.
Figure 2:
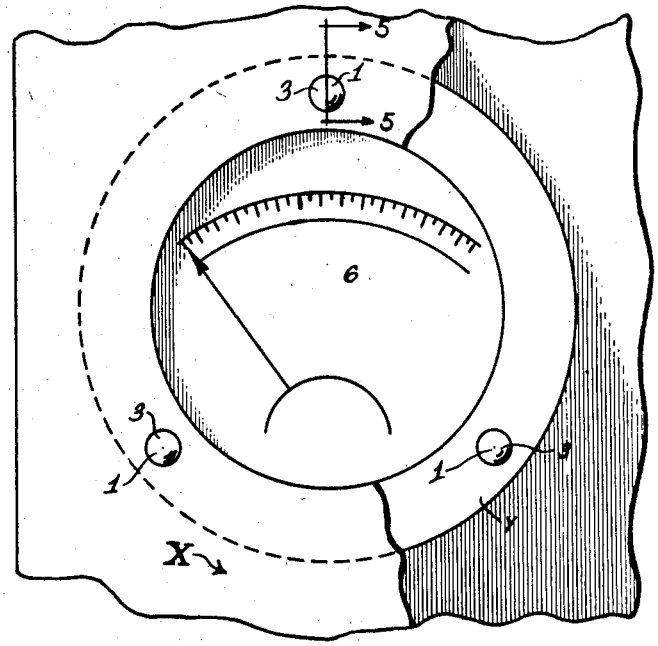
Fig. 2 is a left hand side elevation of Fig. 1.

Preferably, the invention comprises a plurality of short cylinders, oblong bodies, or members 1 (which may be of other acceptable cross sectional shape or outline), each provided with channels, grooves or the like 2 near its opposite ends, thus forming anchor heads 3 integrally joined by necks 4 to the bodies 1. Rubber, either natural or synthetic, is the preferred material and of the two rubbers, natural rubber is the choice. The material is pliable and generally deformable manually as will be more specifically indicated hereinafter. The panel X or other supporting base and the attaching flange Y of the meter 6 to be mounted, or a ring, plate or other connecting means carried by the meter, are provided with perforations, holes or the like 5. Holes 5 are of substantially the same diameter as necks 4.

In applying the invention, the panel area X where the meter is to be mounted is drilled or otherwise provided with the required number of holes or openings 5, in this instance, three. The flange, ring, plate or other element Y carried by or attached to the meter for its mounting is similarly provided with a corresponding number of holes of the same spacing and diameter. The elements 1 are first connected to the panel X by forcing the rounded ends or heads 3 through the openings 5 from the rear or back side of the panel, so that the heads will snap over the edges of, and engage the front face of, the panel beside these apertures, the panel edges thus becoming seated in the channels 2 about the necks 4. Next the flange Y with attached meter will be placed in position behind the panel so that the holes 5 through it may be forced over the heads 3 at the rear ends of 1 so that they will pass through and snap into holding position in the same way as with panel X. The instrument is then pressed forward so as to effect this snap action, by which it becomes fastened. So assembled, elements 1 connect and secure the meter to panel X by three spaced stud-like rubber cylinders giving complete shock protection against vibration in any direction and, at the same time, complete electrical insulation. Should one of the cylinders become damaged in any manner it may be very easily and quickly removed and replaced without demounting the meter or removing any other elements. While the instant mounting is vertical, the base element may be at any other angle or position. Any desired number of the members 1 may be used and, of course, the number will be chosen with due consideration for the size and weight of the equipment. When the instrument 6 is in normal quiescent position, the elements 1 are perpendicular to the panel X and the flange Y. During vibration there will be various degrees of deviation from these relative positions. Also due to the elastic nature or characteristic and qualities of the material of members 1, they will yield in one direction or another angularly so that there will be twisting, torque and attenuation as well as compression and cushioning distortion strains, depending upon the direction, character and degree of vibration stresses.

One of the simplest effective mountings in the use of this invention is the three-point mounting with the members 1 disposed equidistantly in a circle or spaced approximately 120 degrees apart. Where comparatively small or light weight meters, instruments or other objects are to be shock or vibration-insulated, such three point mounting is the preferred disposition. Where the instrument, etc. is larger or heavier, the number of elements 1 will be correspondingly increased and their disposition and distribution will be regulated, varied or prearranged to adequately meet all circumstances of the particular installation.

It is thought that the construction, operation and use of the invention will be clear from the preceding detailed description.

It will be noted that, at both the inner and outer ends of the necks formed by the channels 2, the sides of the channels are planiform and normal to the axes of the necks and of comparatively large area, thus affording bearing surfaces or shoulders extending a substantial distance radially which will engage snugly against opposite faces of the engaged member in the channel and so will distribute pressure loads of these shoulders over considerable areas. The last mentioned function will minimize tendency of the bases of the shoulders next the tongues to wear which would allow the fit of the member 1 to become loose, introducing liability of shocks by slippages and stops of the mounted instrument on the connector support itself after a short period of use, as well as lessening safety. It will also be noted that the radial extent of these shoulders is slightly greater than one quarter but less than one-third the diameter of the neck portion 4. This has been found ample for loads of instruments which the connector-support-cushion member 1 may properly carry, and at the same time allows ready deformation and reduction of transverse measurement of the heads 3 as they are forced through the openings 5, yet without disruption of the material of the heads.

Heads larger in proportion to the necks result in either preventing entry of, or in tearing of, the rubber when the head is forced through the aperture with consequent impairment of the anchorage value of the heads, delays in assembly operations, soiling of work, and possible damage to instruments or other parts.

It will be appreciated that when an instrument is mounted in the manner shown and described, the member 1 serves as a tensile connector and anchor holding the connected parts against separation; as a support stud to maintain the connected parts normally in a predetermined mutual relation, as a compression member serving to limit convergent movement of the connected parts, and as a cushion and shock absorber for shock forces acting in any direction at each of the members 1. In the last named functions the device resists its flexure as well as compression and distension by relative translative movements of the connected parts, as well as by relative rocking tilting or pivotal movements of the connected parts in any direction.

Figure 3:
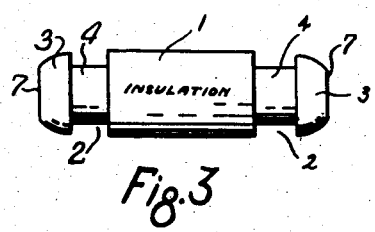
Fig. 3 is an enlarged side elevation of one of the vibration insulator elements.
Figure 5:
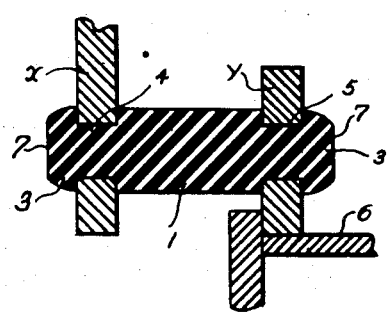
Fig. 5 is an enlarged fragmentary cross section of a panel and instrument assembly embodying my invention, through one of the elements in operative position.
Figure 4:
Fig. 4 is a side elevation of Fig. 3.

It may be seen in Figures 3 and 5 that the peripheries of the heads 3 are extended longitudinally of the member 1 with little if any reduction in diameter for a short distance from the channels 2, and then are curved inwardly to a flat end face 7 of approximately the same or less diameter than that of the holes 5. This will facilitate the assembly operations above described, by causing the rubber to enter the holes by longitudinal pushing of the members 1 toward the holes as stated. The portion of the head adjacent the channel 2 extends for a sufficient distance longitudinally to give body and strength to the extreme edge thereof, so that when the device is engaged in a plate or the like, in case of tensile stresses being applied to the body, a material part of the load pressure transmitted from the head to the engaged structural part will be exerted at the extreme outer parts of the head. This will minimize tendency of the head to pull out of the hole under severe force and will minimize chafing of the rubber by the edges of the hole. The central flat part 7 of the head will oppose inward crowding of material toward the axis of the body 1 by pressure acting longitudinally outward against the extreme edge portions of the head, and so will cause these to carry a heavier load than if a thin lip only formed the outer side of the channel 2.

It will be apparent that in the functioning and use of the body 1 as described, it is flexible, longitudinally compressible and extensible as well as deformable generally. These qualities may all be included in the term "universally deformable."

Changes may be made in the construction, arrangement and disposition of the several parts of the invention within the scope of the appended claim without departing from the scope of the invention and it is meant to include all such within this application wherein only one preferred form has been illustrated purely by way of example and with no thought or intention of, in any degree, limiting the claim thereby.

Having thus described my invention, what I claim and desire to protect by Letters Patent is:

A combined support, connector, separable fastener and electrical and vibration insulator for anchoring coengagement between a base plate member having fastener-receiving apertures therein, and an instrument-carrying plate part having aligned fastener-receiving apertures, said support, connector, fastener and insulator consisting of an elongated stud-like body of soft elastic rubber-like material having near each end a circumscribing groove the bottom of which constitutes a reduced neck with a head thereon, said necks of the same diameter as said fastener receiving apertures of a base plate and instrument-carrying plate part respectively, said grooves having a width the same as the thickness of the apertured parts respectively, each said head being of a size transversely greater than its said neck and shaped and adapted to be forced longitudinally through a respective said aperture by longitudinal thrust of the stud-like member, as a separable fastener and anchor.

DONALD L. BEAM.

REFERENCES CITED

The following references are of record in the file of this patent:

UNITED STATES PATENTS

| Number | Name | Date |
| --- | --- | --- |
| 1,338,766 | Bristol | May 4, 1920 |
| 1,369,389 | Browne | Feb. 22, 1921 |
| 1,731,199 | Keeney | Oct. 8, 1929 |
| 2,070,018 | Mecklenburger | Feb. 9, 1937 |
| 2,194,286 | Lubberhuizen | Mar. 19, 1940 |